UNITED STATES PATENT OFFICE.

WILLIAM RAY CHAPIN, OF INDIANAPOLIS, INDIANA.

WELDING COMPOUND.

1,387,351. Specification of Letters Patent. Patented Aug. 9, 1921.

No Drawing. Application filed May 2, 1919, Serial No. 294,182. Renewed November 23, 1920. Serial No. 426,102.

*To all whom it may concern:*

Be it known that I, WILLIAM R. CHAPIN, a citizen of the United States, residing at Indianapolis, in the county of Marion and State of Indiana, have invented certain new and useful Improvements in Welding Compounds, of which the following is a specification.

My said invention consists in an improved compound for welding steel and particularly designed for welding low carbon steel or iron to high speed or stellite, or to any special steel with "red" hardness properties.

Experience with welding compounds heretofore used shows that they frequently fail to make a good weld because of lack of intimate mixture between the ingredients composing the compound, thereby preventing the proper proportion of the ingredients being used in the weld.

The purpose of my invention is to overcome these difficulties and to provide a compound wherein the ingredients are first so prepared that an intimate mixture is obtained in the form of an impalpable powder so that when thoroughly mixed the several ingredients are present in uniform proportions throughout the entire mixture.

The compound consists of ferro-silicon, borax and powdered iron. The preferable formula consists of 60% ferro-silicon, 20% powdered iron and 20% borax. I have discovered, however, that these proportions may be considerably varied without destroying the efficiency of the compound. It is possible to use as high as 80% of the ferro-silicon, 10% powdered iron and 10% borax. It is also possible to use 50% ferro-silicon, 25% powdered iron and 25% borax. I therefore do not wish to limit myself to the proportion.

As before stated, it is important that the ingredients be reduced to a powdered state before mixing. This is easily done in the case of ferro-silicon and borax. With iron, however, it is more difficult. I have found by experiment that the best results are obtained by pouring molten cast iron through a screen into a vessel of water causing it to form small, round balls of metal, or "shot" and of a very brittle nature, in which form it can be readily pulverized in a mortar, or any suitable pulverizing or grinding machine.

When the three ingredients specified are powdered they are thoroughly mixed producing a compond in the form of an impalpable powder.

The said welding compound is designed particularly for welding low carbon steel or iron to high speed steel or stellite or any special steel having "red hardness properties," as before stated.

In the operation of welding, the surfaces to be welded are first cleaned with a file or emery wheel, or any other suitable means, to free said surfaces of all dirt and foreign substances. The welding compound is then spread over one surface in sufficient quantity to cover the same. The other surface is then placed on top and the mass placed in a suitable furnace or forge and heated to a point where the welding compound fuses and runs freely, the degree of heat required for this purpose being estimated to be between 2200 F. and 2300 F. degrees. As soon as the compound has begun to flow freely the whole mass is removed from the furnace or forge and the excess of the welding compound is squeezed out from between the two surfaces by slight pressure, which may be applied by hand or by means of any suitable mechanical press, the purpose being to squeeze out the excess of the welding compound so that the welding line will be as thin as possible. The best result is obtained in welding steels or stellite by quenching the whole mass in quenching oil immediately after the excess of the welding compound has been squeezed out.

By means of a welding compound composed of the ingredients, and prepared as before specified, I am able to effect a perfect weld at any attempt.

Having thus fully described my said invention, what I claim as new and desire to secure by Letters Patent, is:

1. A welding compound composed of powdered ferro-silicon, powdered iron, and powdered borax, intimately mixed together.

2. A welding compound consisting of ferro-silicon, borax, and iron, the iron being first finely pulverized, and all intimately mixed together.

3. The process of preparing a welding compound which consists in pouring molten iron through a screen into water, then pulverizing the brittle iron shot thus formed, then mixing therewith powdered ferro-silicon and borax.

4. A welding compound composed of ferro-silicon, powdered iron, and borax, in proportion substantially as follows: 60% ferro-silicon, 20% powdered iron, and 20% borax.

In witness whereof, I have hereunto set my hand and seal at Indianapolis, Indiana, this 30th day of April, A. D. nineteen hundred and nineteen.

WILLIAM RAY CHAPIN. [L. S.]

Witnesses:
M. L. WHEELER,
BERTHA B. CLARKE.